US005352163A

United States Patent [19]
Minegishi et al.

[11] Patent Number: 5,352,163
[45] Date of Patent: Oct. 4, 1994

[54] STEP-UP OR REDUCTION GEAR SERIES USING INTERNALLY MESHING PLANETARY GEAR STRUCTURE

[75] Inventors: Kiyoji Minegishi, Aichi; Shigeru Toyosumi, Ohbu; Takashi Haga, Ohbu; Ryoji Sakurai, Ohbu, all of Japan

[73] Assignee: Sumitomo Heavy Industries, Ltd., Tokyo, Japan

[21] Appl. No.: 47,293

[22] Filed: Apr. 19, 1993

[30] Foreign Application Priority Data

Apr. 21, 1992 [JP] Japan ................................ 4-101067

[51] Int. Cl.$^5$ .............................................. F16H 1/32
[52] U.S. Cl. .................................................. 475/178
[58] Field of Search ................ 475/162, 168, 176, 178

[56] References Cited

U.S. PATENT DOCUMENTS

| | | | |
|---|---|---|---|
| 2,508,121 | 5/1950 | McIver | 475/178 |
| 3,160,032 | 12/1964 | Black | 475/178 X |
| 3,192,799 | 7/1965 | Pamplin | 475/176 X |
| 3,430,523 | 3/1969 | Meritt | 475/178 X |
| 5,222,922 | 6/1993 | Takahashi et al. | 475/178 |

FOREIGN PATENT DOCUMENTS

| | | | |
|---|---|---|---|
| 488161 | 6/1992 | European Pat. Off. | 475/178 |
| 2112631 | 9/1972 | Fed. Rep. of Germany | 475/178 |
| 56-35552 | 8/1981 | Japan . | |
| 59-106744 | 6/1984 | Japan | 475/168 |
| 61-266849 | 11/1986 | Japan | 475/168 |
| 62-2043 | 1/1987 | Japan | 475/178 |
| 1-108440 | 4/1989 | Japan | 475/178 |
| 4-282046 | 10/1992 | Japan | 475/178 |
| 5-272598 | 10/1993 | Japan . | |
| 1618938 | 1/1991 | U.S.S.R. | 475/176 |

Primary Examiner—Dirk Wright
Attorney, Agent, or Firm—Nikaido, Marmelstein, Murray & Oram

[57] ABSTRACT

A series of transmission gears use an internally meshing planetary gear structure. The structure has a first shaft, eccentric bodies provided on the first shaft, and external gears mounted on the eccentric bodies through bearings. An internal gear internally meshes with the external gears, and a second shaft is connected to the external gears through means for transmitting only the rotational component of the external gears. The series includes a group of sub-series of the transmission gears, including transmission gears which are different from each other in a speed change ratio within a range from a low speed change ratio to a high speed change ratio, and which are the same in the mating dimension for installation to a mating machine. The transmission gears in the same sub-series include a type of transmission gears of a low angular backlash type which do not reduce the angular backlash. Each type of transmission gear has a same speed change ratio, a same mating dimension, and a same transmission capacity.

6 Claims, 5 Drawing Sheets

STEP-UP OR REDUCTION GEAR SERIES USING INTERNALLY MESHING PLANETARY GEAR STRUCTURE

BACKGROUND OF THE INVENTION

1. Field of the Invention

The present invention relates to a series of step-up or reduction gears using an internally meshing planetary gear structure.

2. Description of the Prior Art

Conventionally, there has been known a multi-line type internally meshing planetary gear structure. It includes a first shaft; eccentric bodies rotated by the rotation of the first shaft; a plurality of external gears mounted on the eccentric bodies through bearings to be freely eccentrically rotated around the first shaft; and an internal gear internally meshing with the external gears through internal teeth constituted of external pins; and a second shaft connected to the external gears through inner rollers for taking out only rotational component of the external gears.

A conventional example of such a structure is shown in FIGS. 3 and 4. In this example, the above first shaft corresponds an input shaft and the second shaft corresponds an output shaft, and further, the internal gear is fixed. Thus, this structure is applied to a reduction gear.

Eccentric bodies 3a and 3b are fitted around an input shaft 1 with a specified phase difference respectively (180° in this example). The eccentric bodies 3a and 3b are disposed to be eccentric with the input shaft (center $O_1$) by an eccentric amount e (center $O_2$), respectively. Two external gears 5a and 5b are mounted in a multi-line around the eccentric bodies 3a and 3b through bearings 4a and 4b, respectively. A plurality of inner roller holes 6a and 6b are provided on the external gears 5a and 5b, respectively. Inner pins 7 and inner rollers 8 are inserted in the inner roller holes 6a and 6b, respectively.

To increase the transmission capacity, hold the strength and keep the rotational balance, the external gears are disposed in a multi-line.

The external teeth 9 having a trochoidal teeth shape, a circular-arc teeth shape or the like are provided around the outer periphery of each of the external gears 5a and 5b. The external teeth 9 internally mesh with the internal gear 10 fixed on a casing 12. The internal teeth of the internal gear 10 have such a structure that the external pins 11 are freely inserted and held in external pin holes 13 in a manner to be easily rotated, respectively. The internal pins 7 passing through the external gears 5a and 5b are rigidly fixed or fitted in the casing 12 near an output shaft 2.

With the input shaft 1 rotated by one time, the eccentric bodies 3a and 3b are also rotated by one time. By the one rotation of the eccentric bodies 3a and 3b, the external gears 5a and 5b are intended to be rotated around the input shaft 1. However, since the internal gear 10 is restricted in its rotation, the external gears 5a and 5b are almost swayed while internally meshing with the internal gear 10.

Assuming that the number of the gear teeth in the external gears 5a and 5b is taken as N, and the number of the gear teeth in the internal gear 10 is taken as (N+1), the difference in the number of the gear teeth becomes 1. Accordingly, the external gears 5a and 5b are shifted (rotated) by one gear tooth with respect to the internal gear 10 fixed on the casing 2 for each rotation of the input shaft 1. Namely, one rotation of the input shaft 1 is reduced in the rotation of $-1/N$ of the external gears 5a and 5b.

As for the rotation of the external gears 5a and 5b, the swaying component is absorbed by gaps between the inner roller holes 6a and 6b and the inner pins 7 (inner rollers 8), and thus only the rotational component is transmitted to the output shaft 2 through the inner pins 7. This makes it possible to achieve the reduction at a reduction ratio of $-1/N$.

The internally meshing planetary gear structure described above has been applied to various types of reduction gears or step-up gears. In the above structure, the first shaft corresponds an input shaft and the second shaft corresponds an output shaft, and further, the internal gear is fixed. However, for example, if the first shaft corresponds an input shaft and the internal gear corresponds an output shaft, and further, the second shaft is fixed, then, that can also constitute a reduction gear. Further, in these structures, it is possible to constitute a step-up gear by replacing the input shaft by the output shaft.

FIG. 5 shows an example wherein the above structure is of a unit type (Japanese Patent Laid-open No. sho 62-2043). In this structure, an output shaft 2 is mounted on the mating-machine through a bolt hole 14, wherein the internally meshing planetary gear structure itself is the same as shown in FIGS. 3 and 4. Accordingly, the members corresponding to those as shown in FIGS. 3 and 4 are designated at like reference characters. The internally meshing planetary gear structure is also used in the reduction gear or step-up gear of this type.

In the gear transmission mechanism, a gap or looseness is generally present between gears meshing with each other or in the mounting means to the shaft. As a consequence, when the normal rotation is converted to the reverse rotation, the reverse on the drive side does not appear instantly as the reverse on the driven side.

Hereinafter, for convenience, the gap or looseness generated in conversion from the normal rotation to the reverse rotation is referred to as "angular backlash". Namely, the angular backlash means how the input shaft should be reversed in order to reverse the output shaft accompanied therewith. In other words, the angular backlash is defined as an amount (angle) which permits the other shaft to move in the state that one shaft (low speed side or high speed side) is stopped. Therefore, the angular backlash does not mean how the gap is present in the state that each gear or the like is assembled.

In the transmission mechanism using a multi-line type internally meshing planetary gear structure described above, generally, the gaps or loosenesses at respective meshed portions interfere with each other so that such an angular backlash is made to be relatively smaller.

However, even in the above gear structure, since the driving power is transmitted by the meshing between gears, the angular backlash, while being small, is generated in conversion from the normal rotation to the reverse rotation as a necessity. When the transmission mechanism is used as a controller dealing with the normal and reverse rotations, the presence of such an angular backlash unfavorably lowers the accuracy. Also, it has a tendency of generating a shock, which is inconvenient in terms of the mechanical durability of the transmission mechanism itself.

For making smaller the above angular backlash, there has been adopted a technique of enhancing the machining accuracies of the parts, or of selectively assembling the parts to be used.

Also, in Japanese Patent Laid-open No. sho 59-106744 (Japanese Patent Publication No. hei 3-3820) or the like, an eccentric body is axially divided in correspondence with external gears, and mounting means for mounting the divided eccentric bodies to a shaft are rotatable with respect to the shaft. Thus, by giving the "pre-loading" on the divided eccentric bodies in the reverse directions, in the mounted state, the angular backlash in the normal rotation is removed by one divided eccentric body, whereas the angular backlash in the reverse direction is removed by the other divided eccentric body.

In Japanese Utility Model No. sho 56-35552, an internal gear 10 and outer pins 11 are axially divided in correspondence with external gears 5a and 5b, and mounting means for mounting the divided internal gears 10 to a casing 12 are rotatable with respect to the casing 12. Thus, by giving the "pre-loading" on the divided internal gears 10 in the reverse directions, in the mounted state, the angular backlash in the normal rotation is removed by one divided internal gear, whereas the angular backlash in the reverse direction is removed by the other divided internal gear.

Incidentally, in the internally meshing planetary gear structure described above, the reduction gear ratio can be freely changed only by changing the external gears 5a and 5b, internal gear 10, external pins 11 and eccentric bodies 3a and 3b.

Thus, it is possible to cope with the various requirements of users by previously preparing a sub-series (hereinafter, referred to as "frame number"). In the respective frame number, the mating dimensions (sizes) to the mating-machine determined by the dimensions (sizes) of the output shaft 2 and the casing 12 are determined in several kinds according to the market requirement. And in time same frame number, the several kinds of the speed change ratios are previously set.

Concretely, in a well-known example, there have been prepared the reduction gears, in various frame numbers, which have reduction gear ratios of from 1/6 to 1/119, motor assemblies of from 0.1 kw to 132 kw, and output torques of from 0.35 kgm to 6000 kgm.

However, the conventional reduction gear series using the internally meshing planetary gear structure has not sufficiently coped with the diversification of motors and their usages accompanied with the rationalization in the recent production system.

For example, in the field of the physical distribution system frequently using the reduction gears of this kind, it is effective to operate the necessary parts of the physical distribution system constituted of a plurality of conveyors at the necessary timing. Consequently, the conveyors have been required to be independently driven.

Further, two kinds of conveyors have been required in terms of the function. One is enough to have the function of only moving matters to be carried. The other requires the carrying speed control and the stopping control at the specified position. Hereinafter, for convenience, the former is referred to as "general conveyor", and the latter is referred to as "control conveyor".

In general, the general conveyor uses the assembly of the cage type induction motor and the reduction gear. On the other hand, the control conveyor uses the assembly of the servo-motor and the reduction gear. As the reduction gear assembled with the servo-motor, there has been required a low backlash type reduction gear, which has a small angular backlash and is suitable for the stopping control at the specified position.

In the viewpoint of the reduction gear used in such a conveyor, since the reduction gear only constitutes a part of the mating-machine (conveyor or the like), and further, since the mating-machine only constitutes a part of the whole physical distribution system, accordingly, there are cases that the reduction gear is required the function as the general conveyor, and occasionally is required the function as the control conveyor in the relationship with the whole physical distribution system.

On the other hand, for improvement in the maintenance performance or the productivity of the whole system, it is convenient to reduce the kinds of the conveyors in one system. Namely, it is desirable to suitably change the general conveyor into the control conveyor only by changing the reduction gear and the motor (and its controller).

However, the prior arts and commercial reduction gear series could not meet the above requirements.

Namely, in the so-called "pre-loading" disclosed in Japanese Patent Laid-open No. sho 59-106744 and Japanese Utility Model No. sho 56-35552, the plural external gears are provided in the multi-line for increasing the transmission capacity and holding the strength. However, actually, in the normal rotation, the power si transmitted only by the external gear without the angular backlash in the normal direction, whereas in the reverse rotation, the power is transmitted only by the external gear without the angular backlash in the reverse direction. Consequently, there has arisen a new problem of making wasteful the advantage obtained by the multi-line mechanism described above.

In other words, in the "pre-loading" in Japanese Patent Laid-open No. sho 59-106744 and Japanese Utility Model No. sho 56-35552, although the angular backlash is reduced, the transmission torque capacity is reduced by half. Accordingly, in order to obtain the same transmission torque capacity, the reduction gear in a larger frame number (the mounting dimension (size) is made larger) is required. This causes such a disadvantage of eliminating the interchangeability. Further, according to the space environment, a problem is encounted in that the reduction gear as the control conveyor cannot be mounted on such a location that the reduction gear as the general conveyor can be mounted.

SUMMARY OF THE INVENTION

It is therefore an object of the present invention to provide a reduction gear series wherein, according to the function necessary for a physical distribution system, for example, conveyors and the like, a low backlash reduction gear can be selected in the application requiring the speed control and the specified position stopping control, and a low cost reduction gear is suitably selected with the same mating dimension and the transmission capacity in the other application. Namely, the above problems can be solved, according to the present invention, by providing the reduction gear in the above series to users in a short delivery and a low cost, which can be easily modified in its usage in the whole system by the users.

To achieve the above problems, according to the present invention, there is provided a series of reduction or set-up gears using an internally meshing planetary gear structure including: a first shaft; eccentric bodies provided on the first shaft; external gears mounted on the eccentric bodies through bearings; an internal gear internally meshing with the external gears; and a second shaft connected to the external gears through means for transmitting only the rotational component of the external gears.

The above series comprises a group of sub-series, the sub-series including reduction gears (step-up gears) which are different from each other in the speed change ratio within a range from a low speed change ratio to a high speed change ratio, but which are the same in the mating dimension (size) for installation to a mating-machine.

Further, the each sub-series comprises at least two types of a low angular backlash type which is considered in design so as to make smaller an angular backlash between the low speed side and the high speed side, and a general type which is not particularly considered in design so as to make smaller the angular backlash, with the same speed change ratio, mating dimension, and transmission capacity.

In addition, the angular backlash in a low backlash type is preferably designed to be 0.1° or less on the low speed side (output side in the reduction gear) in the state that the high speed side is fixed.

The reduction of the angular backlash in the low backlash type may be realized by methods except the pre-loading method disclosed in Japanese Patent Laid-open No. sho 59-106744 and Japanese Utility Model No. sho 56-35552 described above.

Further, the first shaft of the above internally meshing planetary gear structure is preferably of a hollow shaft type wherein a hollow (or hole) through which the rotational shaft of the mating-machine can be inserted.

Prior to the description of the embodiment, there will be briefly described the conception of the present invention.

Namely, the present inventor has widely examined the (lower limit of) angular backlash of the reduction gear necessary for the control conveyor, and the actual angular backlash of the well-known internally meshing planetary reduction gear. As a result, it was found that the angular backlash of the reduction gear necessary for the control conveyor driven by the servo-motor is sufficient to be 0.1° or less on the output shaft side (low speed side) in the state that the input shaft is fixed.

Also, it was confirmed that the actual angular backlash within the above range can be realized without using the pre-loading method of axially dividing the external gears and internal gear for giving the pre-loads in the normal and reverse directions, which is disclosed in Japanese Patent Laid-open No. sho 59-106744 (Japanese Patent Publication No. hei 3-3820) and Japanese Utility Model No. sho 56-35552.

Namely, in the internally meshing planetary reduction gear, by setting the dimension of each part (including the tolerance) during machining and by suitably selecting the finished parts, there can be reduced the following gaps:

① the gaps between the keys and key grooves for connecting the input shaft 1 to the eccentric bodies 3, ② the gaps among the eccentric bodies 3, bearings 4, and external gears 5, ③ the gaps among the external teeth 9 of the external gears 5, external pins 11 and external pin holes 13, and ④ the gaps among the internal roller holes 6 of the external gears 5, internal rollers 8, and internal pins 7.

As long as these accuracies is realized without using the pre-loading method, it is possible to sufficiently ensure the same speed change ratio and transmission capacity in the same frame number (mating dimension).

Thus, as a separate series, there is previously prepared a low backlash type internally meshing planetary reduction gear series wherein the frame number (mating dimension), speed change ratio and transmission capacity are set within the well-known series, and the angular backlash is adjusted to be, for example, 0.1° or less on the low speed shaft side. As a result, by suitably selecting both types according to the function necessary for the conveyor, it is possible to extremely improve the usage of the series. The present invention has been made on the basis of the above knowledge.

Namely, according to the series of the present invention, in the same frame number (in the same sub-series), there are prepared two types of a low backlash type having a small backlash with the same speed change ratio, mating dimension and transmission capacity, and a general type without specifying the angular backlash.

Since the mating dimension of each type to the mating-machine is set to be the same, for example, large sized parts such as a casing, flange and the like are made to be shared. Accordingly, although two types or more are prepared, the cost is not so much raised because the number of the common parts can be increased.

Also, since the two type of reduction gears in the same sub-series are different from each other only in the type, that is, a low backlash type or general type, and have the common factors such as the speed change ratio, mating dimension and transmission capacity. Therefore, the user may select the reduction gear according to the application as the general conveyor or the control conveyor. Accordingly, it is possible to extremely make easy the handling (usage) of the series.

Further, in the case that the transmission capacity is the same, the outside diameter is also the same, it is possible to eliminate such an inconvenience that the reduction gear as the control conveyor cannot be mounted at a location where the reduction gear as the general conveyor is previously mounted.

BRIEF DESCRIPTION OF THE INVENTION

The above and other objects, features and advantages of the present invention will become more apparent from the following explained of the invention taken in conjunction with the accompanying drawings, wherein like reference characters designate the same or similar parts, and wherein.

DETAILED DESCRIPTION OF THE PREFERRED EMBODIMENTS

Hereinafter, the embodiments of the present invention will be explained with reference to the drawings.

Figure 1:
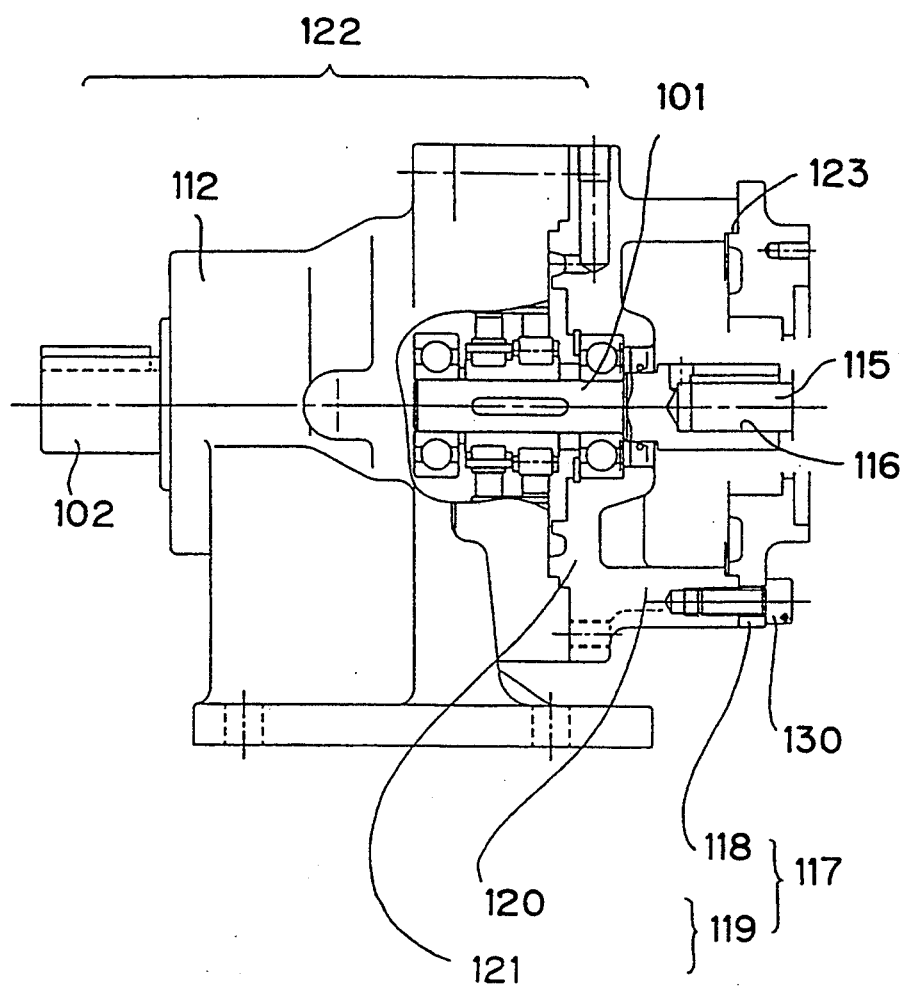
FIG. 1 is a sectional view showing an embodiment of a low backlash type of an internally meshing planetary reduction gear according to the present invention.

FIG. 1 shows an example, wherein an input shaft box for mounting a servo-motor is additionally provided on a low backlash type internally meshing planetary reduction gear according to the present invention.

Figure 2:
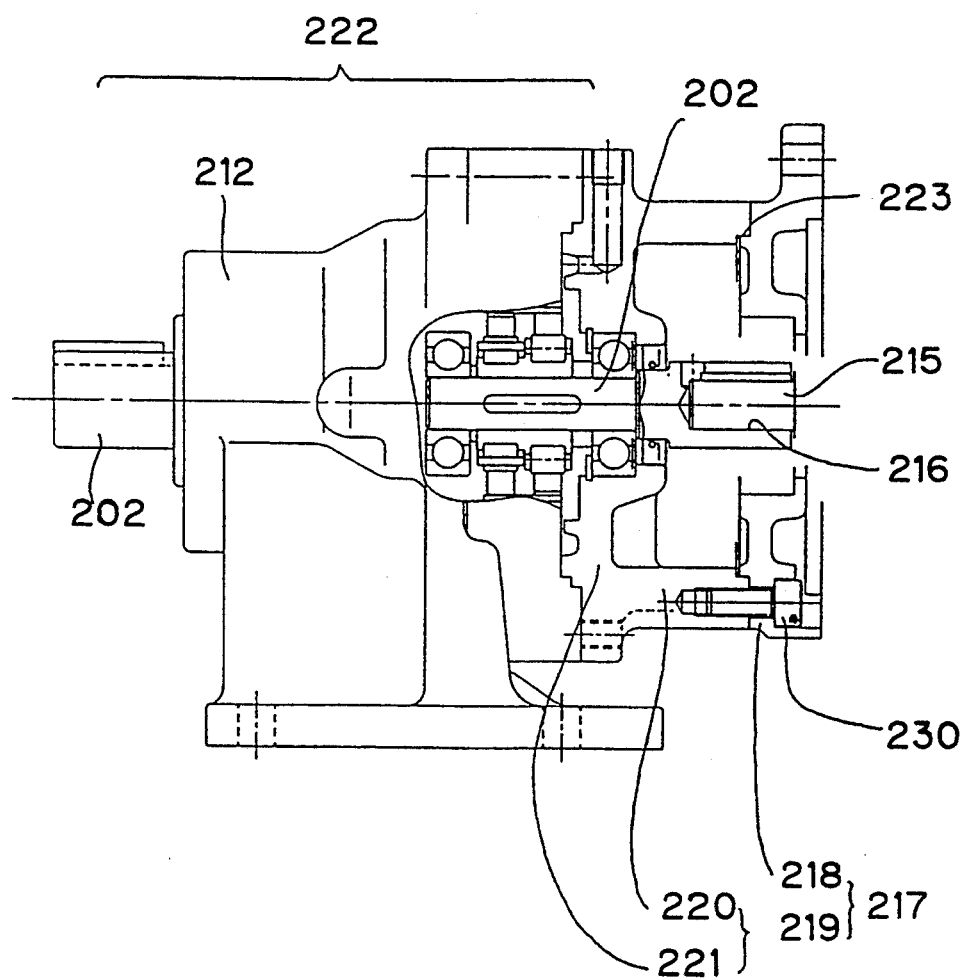
FIG. 2 is a sectional view showing an example having the same internally meshing planetary reduction gear and capable of mounting a servo-motor having a large flange dimension.

FIG. 2 show an example, wherein an input shaft box for mounting a servo-motor having a larger flange dimension than that as shown in FIG. 1 is additionally provided on the same low backlash type internally meshing planetary reduction gear as shown in FIG. 1.

In both the examples as shown in FIGS. 1 and 2, the structure of the input side is of the so-called hollow input shaft, which includes an input shaft 101 (201) having a hollow hole 116 (216) directly connected to a motor shaft 115 (215) of a servo-motor (not shown). Also, on the input shaft 101 (201) side of a casing 112 (212), an input shaft box 117 (217) includes a motor mounting plate 118 (218) for mounting a flange portion of the servo-motor, and a gear Side flange 119 (219). The gear side flange 119 (219) is composed of an end disk portion 121 (221) constituting a gear box of an internally meshing planetary reduction gear 122 (222) and an annular portion 120 (220) extending from the end disk portion 121 (212). The input shaft box 117 (217) can previously prepared according to the dimension of each servo-motor.

As a result, each servo-motor having different flange dimension can be freely mounted on the internal meshing planetary reduction gear 122 (222) already mounted on a conveyor.

In addition, reference numeral 123 (223) designates a spigot joint portion between the gear side flange 119 (219) of the input shaft box 117 (217) and the motor mounting plate 118 (218). Reference numeral 102 (202) designates an output shaft, and 130 (230) is an input shaft box fixing bolt.

Figure 3:
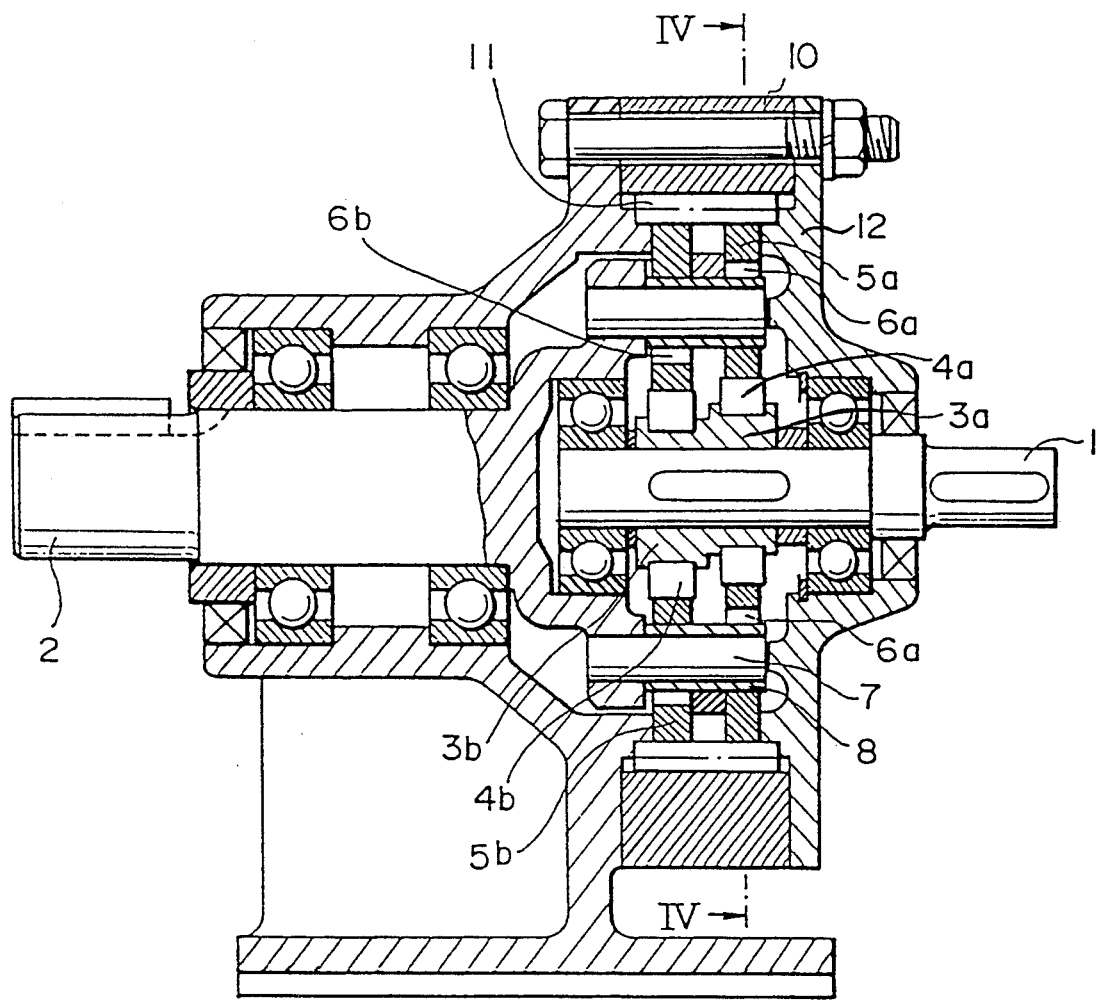
FIG. 3 is a sectional view showing an example of the reduction gear to which the conventional internally meshing planetary gear structure is applied.
Figure 4:
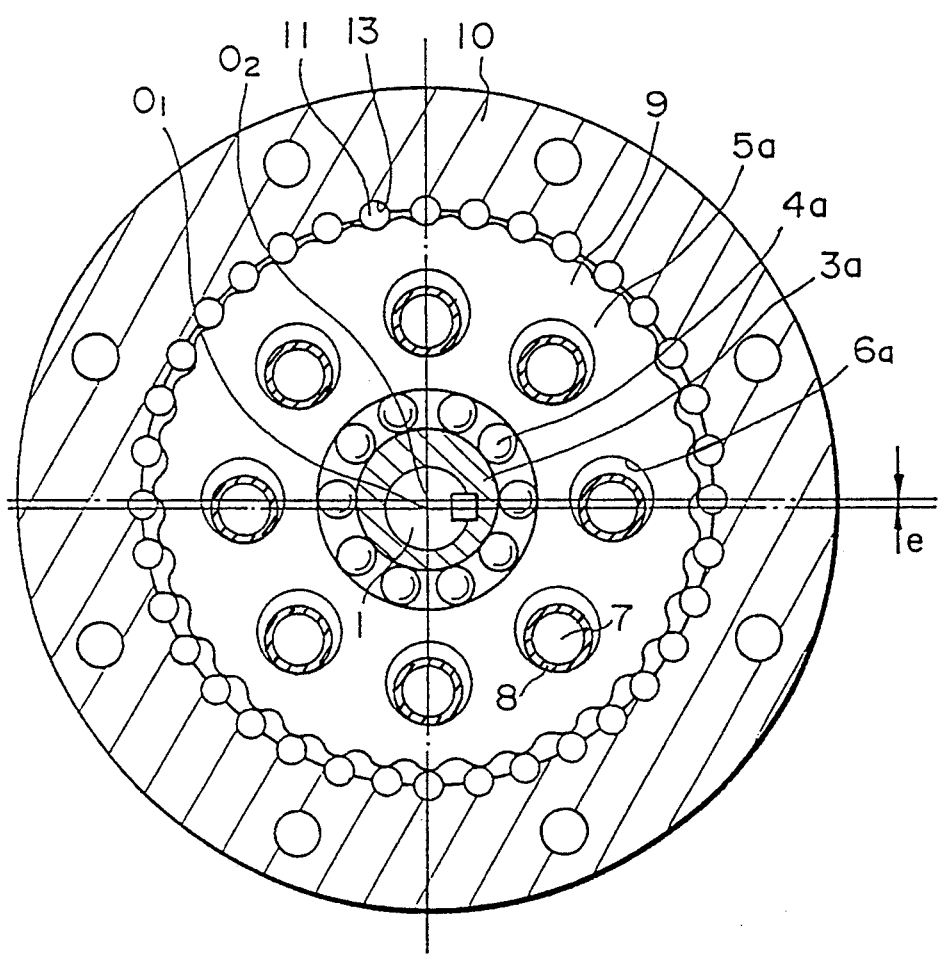
FIG. 4 is a sectional view taken along the line IV—IV of FIG. 3.
Figure 5:
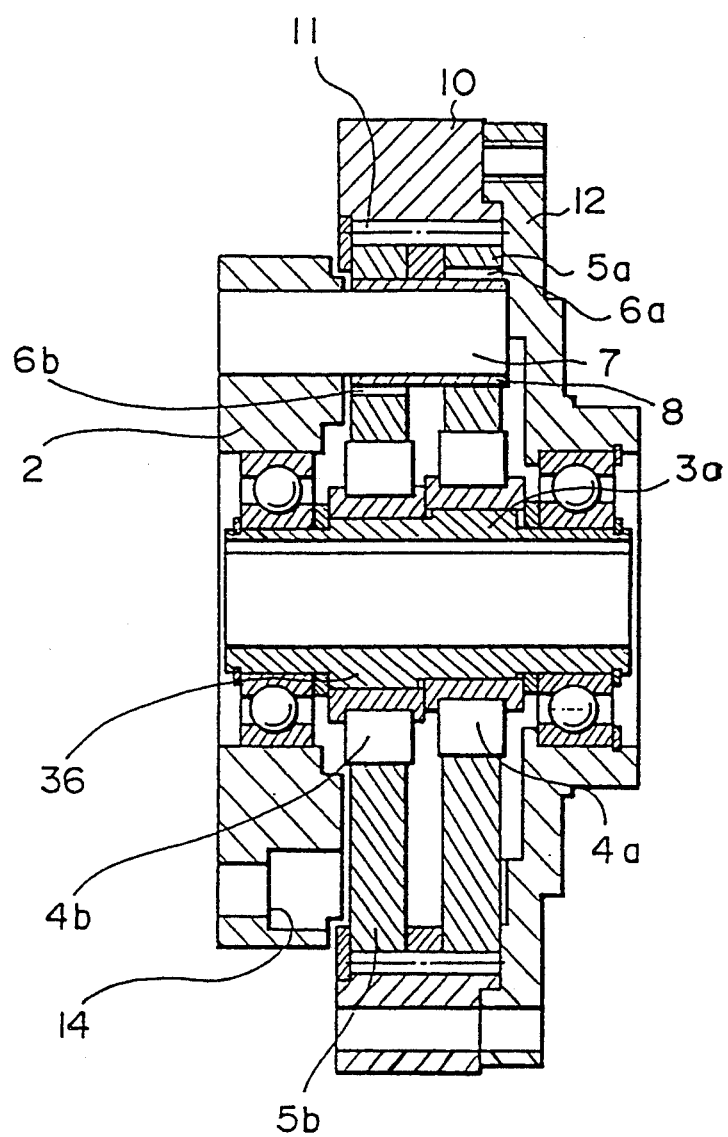
FIG. 5 is a sectional view showing an example of the other reduction gear to which the conventional internally meshing planetary gear structure is applied.

The concrete structure of the internally meshing planetary reduction gear 122 (222) itself adopts the above construction shown in FIGS. 3 and 4 as it is. However, the dimensions in design are set such that the gaps between respective members are made smaller than those in the general type, and the allowable tolerance of each dimension is also made smaller than that in the general type for performing the preferable assembly despite the above reduced gaps. As a result, after assembly, the angular backlash is in the range of 0.1° or less on the output Shaft 112 side.

In addition, according to the present invention, since both the low backlash type and general type are basically the same in the speed change ratio, mating dimension and transmission capacity, it is difficult in terms of the structure to realize the low backlash by the so-called "pre-loading" (Unless the number of the external gears are increased by twice with the same mating dimension, it cannot be realized). However, as described above, the angular backlash of 0.1° can be sufficiently realized by the other method. In addition, besides the method of reducing the dimensional tolerance, there may be suitably combined a technique for improving various accuracies other than the "pre-loading", which is disclosed in Japanese Patent Laid-open No. hei 4-66631 (unknown) for example.

Namely, the present invention does not limit how the low backlash is realized.

Anyway, the feature of the present invention lies in that a series of a low backlash type having a small angular backlash with the same mating dimension, speed change ratio and transmission capacity is prepared in the same frame number, separately from the conventional general series.

The low backlash type internally meshing planetary reduction gear has a small backlash, which makes it possible to realize the control conveyor having a preferable stoppage accuracy and the like, for example, by assembly with the servo-motor.

Also, the general conveyor mounting the conventional general type reduction gear can be improved in its function to the control conveyor if needed, because the drive unit can be easily changed into the servo-motor and the low backlash type internally meshing planetary reduction gear. Also, the reversed replacement can be easily made. Namely, the conveyor can be freely changed in its function without modifying the basic structure at high cost in the physical distribution system at all.

As describe above, in the present invention, for example, according to the function necessary for the conveyor or the like of the physical distribution system, a low backlash reduction gear can be selected in the application requiring the speed control and the specified position stopping control and the like, and the general type reduction gear at a low cost can be selected in the other application with the same speed change ratio, mating dimension and transmission capacity. Therefore, it is possible to obtain the excellent effect of extremely improving the usage of the reduction gear in the whole physical distribution system.

What is claimed is:

1. A series of transmission gears using an internally meshing planetary gear structure having a first shaft, eccentric bodies provided on said first shaft, external gears mounted on said eccentric bodies through bearings, an internal gear internally meshing with said external gears, and a second shaft connected to said external gears through means for transmitting only the rotational component of said external gears, said series also comprising:

a group of sub-series of the transmission gears, the sub-series of the transmission gears including transmission gears which are different from each other in a speed change ratio within a range from a low speed change ratio to a high speed change ratio, and which are the same in the mating dimension for installation to a mating-machine, wherein transmission gears in a same sub-series comprise a transmission gear of a low angular backlash type which is configured to reduce an angular backlash between the low speed side and the high speed side, and a general type of transmission gear of a general angular backlash type which does not reduce the angular backlash, each type of transmission gear having a same speed change ratio, a same mating dimension, and a same transmission capacity.

2. A series of transmission gears using an internally meshing planetary gear structure according to claim 1, wherein the angular backlash in said low backlash type gears is designed to be 0.1° or less on the low speed side in a condition that the high speed side is fixed.

3. A series of transmission gears using an internally meshing planetary gear structure according to claim 1, wherein the first shaft of said internally meshing planetary gear structure is of a hollow shaft type.

4. A series of transmission gears using an internally meshing planetary gear structure according to claim 2, wherein the first shaft of said internally meshing planetary gear structure is of a hollow shaft type.

5. A series of transmission gears using an internally meshing planetary gear structure according to claim 1, wherein the first shaft of said internally meshing planetary gear structure is of a hollow shaft type.

6. A series of transmission gears using an internally meshing planetary gear structure according to claim 2, wherein the first shaft of said internally meshing planetary gear structure is of a hollow shaft type.

* * * * *